United States Patent
Suzuki

(10) Patent No.: US 7,973,706 B2
(45) Date of Patent: Jul. 5, 2011

(54) SBAS NAVIGATION DATA UPDATE NOTIFYING SYSTEM AND METHOD USED IN GBAS

(75) Inventor: Kazushi Suzuki, Tokyo (JP)

(73) Assignee: NEC Corporation, Tokyo (JP)

( * ) Notice: Subject to any disclaimer, the term of this patent is extended or adjusted under 35 U.S.C. 154(b) by 296 days.

(21) Appl. No.: 12/406,515

(22) Filed: Mar. 18, 2009

(65) Prior Publication Data

US 2009/0251365 A1 Oct. 8, 2009

(30) Foreign Application Priority Data

Apr. 7, 2008 (JP) ................................. 2008-099479

(51) Int. Cl.
*G01S 19/06* (2010.01)
*G01S 19/07* (2010.01)

(52) U.S. Cl. ......... 342/357.29; 342/357.43; 342/357.44; 342/357.52

(58) Field of Classification Search ............. 342/357.24, 342/357.29, 357.31, 357.33, 357.42–357.44, 342/357.48, 357.49, 357.52, 357.53, 357.64; G01S 19/02, 19/06, 19/07, 19/11, 19/12, G01S 19/15, 19/33, 19/41
See application file for complete search history.

(56) References Cited

U.S. PATENT DOCUMENTS

| 5,600,329 | A | * | 2/1997 | Brenner | 342/357.44 |
| 6,826,476 | B2 | * | 11/2004 | Ahlbrecht et al. | 701/213 |
| 2006/0132358 | A1 | * | 6/2006 | Holderle et al. | 342/357.02 |

FOREIGN PATENT DOCUMENTS

| JP | 1993234000 A | 9/1993 |
| JP | 2000275317 A | 10/2000 |
| JP | 2003018061 A | 1/2003 |
| JP | 2004198291 A | 7/2004 |
| WO | WO 2008094090 A1 * | 8/2008 |

* cited by examiner

*Primary Examiner* — Thomas H Tarcza
*Assistant Examiner* — John B Vigushin

(57) ABSTRACT

To maintain the safety by avoiding deterioration in the positioning accuracy through making SBAS satellite navigation data used in a ground system and in an airborne system consistent by employing GBAS. The system includes: a ground system which estimates errors contained in ranging signals received from the navigation satellites, and formats and transmits correction information for correcting the estimated errors; and an airborne system which calculates differential GPS positioning based on the ranging signals received from the navigation satellites and the formatted correction information, and displays a displacement from a regulated route. The ground system notifies update, when SBAS satellite navigation data used for generating the correction information is updated, by adding information regarding update of navigation data to the correction information. The airborne system detects the transmitted update notification of the SBAS satellite navigation data, and calculates the differential GPS positioning by switching to the updated navigation data.

9 Claims, 8 Drawing Sheets

FIG. 5
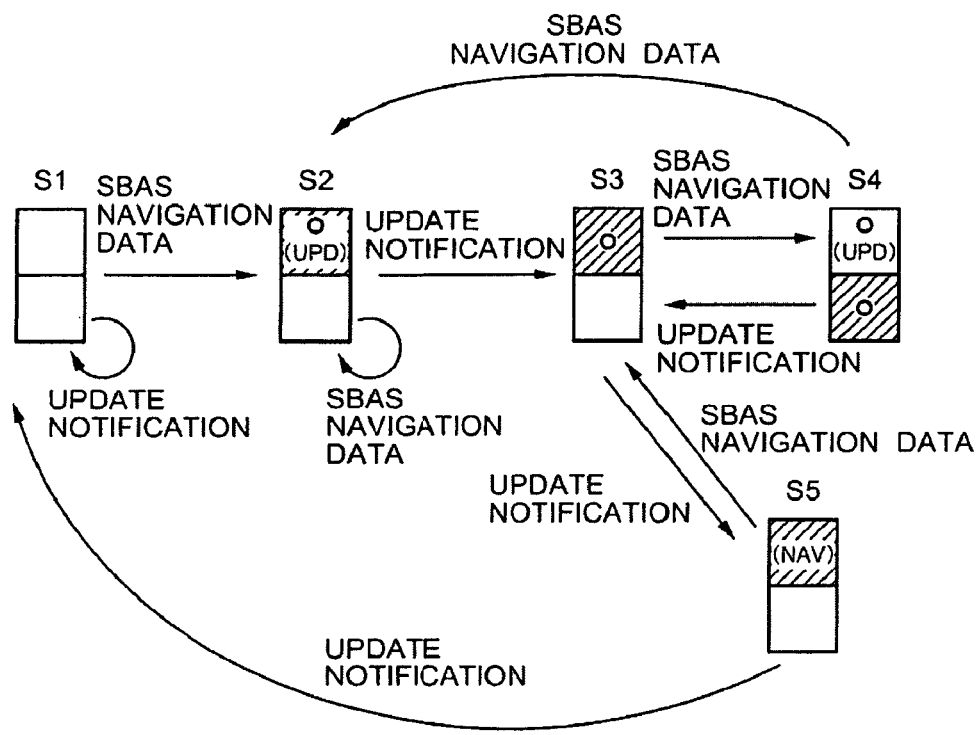
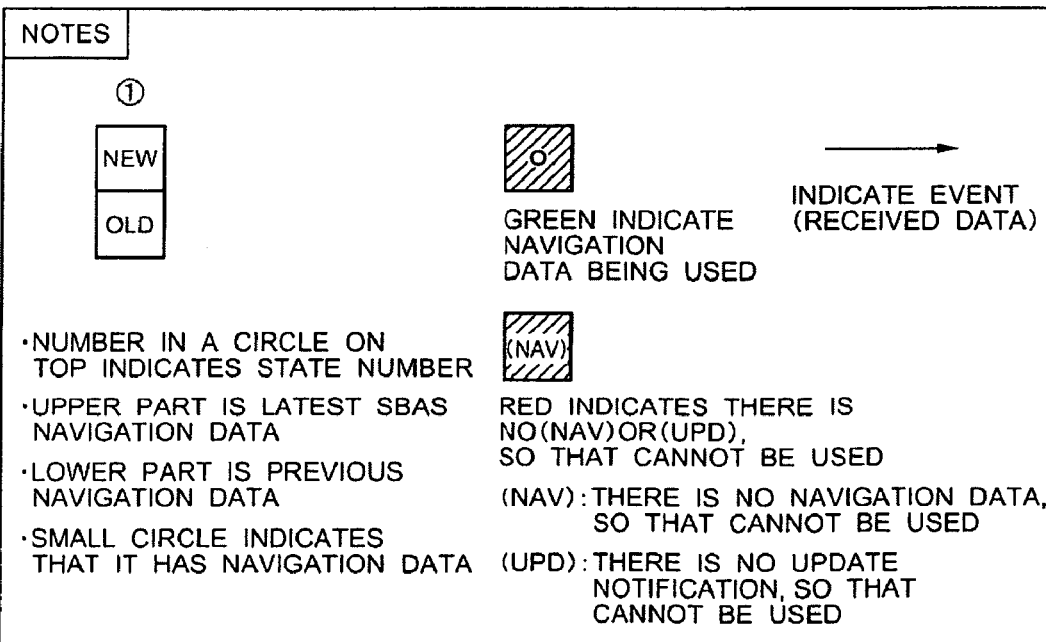

FIG. 6

| STATE | EXPLANATIONS OF STATES | SBAS NAVIGATION DATA TO BE USED |
|---|---|---|
| S1 | INITIAL STATE WHERE NO SBAS NAVIGATION DATA(OLD/NEW GENERATIONS) IS PRESENT | UNUSABLE |
| S2 | STATE WHERE ONLY NEW-GENERATION SBAS NAVIGATION DATA IS PRESENT(STATE WHERE SBAS NAVIGATION DATA HAS BEEN RECEIVED, AND WAITING FOR UPDATE NOTIFICATION SINCE UPDATE NOTIFICATION HAS NOT BEEN RECEIVED) | UNUSABLE |
| S3 | STATE WHERE ONLY NEW-GENERATION SBAS NAVIGATION DATA IS PRESENT(STATE WHERE SBAS NAVIGATION DATA IS BEING USED SINCE UPDATE NOTIFICATION HAS BEEN RECEIVED) | NEW GENERATION |
| S4 | STATE WHERE TWO GENERATIONS OF OLD AND NEW SBAS DATA ARE PRESENT(STATE WHERE OLD-GENERATION SBAS NAVIGATION DATA IS CONTINUOUSLY USED, SINCE UPDATE NOTIFICATION HAS NOT BEEN RECEIVED) | OLD GENERATION |
| S5 | STATE WHERE NO SBAS NAVIGATION DATA (OLD/NEW GENERATIONS) IS PRESENT(STANDBY STATE FOR SBAS NAVIGATION DATA, SINCE UPDATE NOTIFICATION HAS ALREADY BEEN RECEIVED) | UNUSABLE |

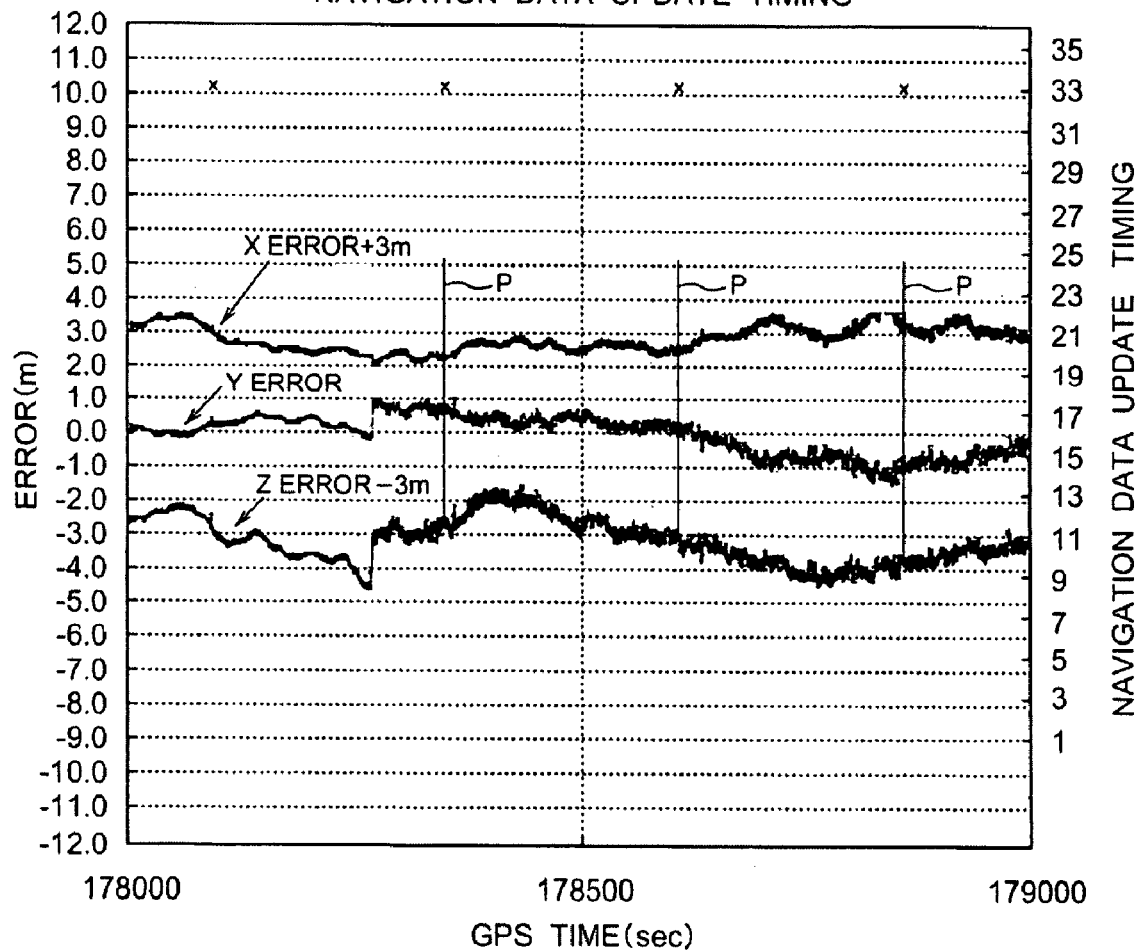

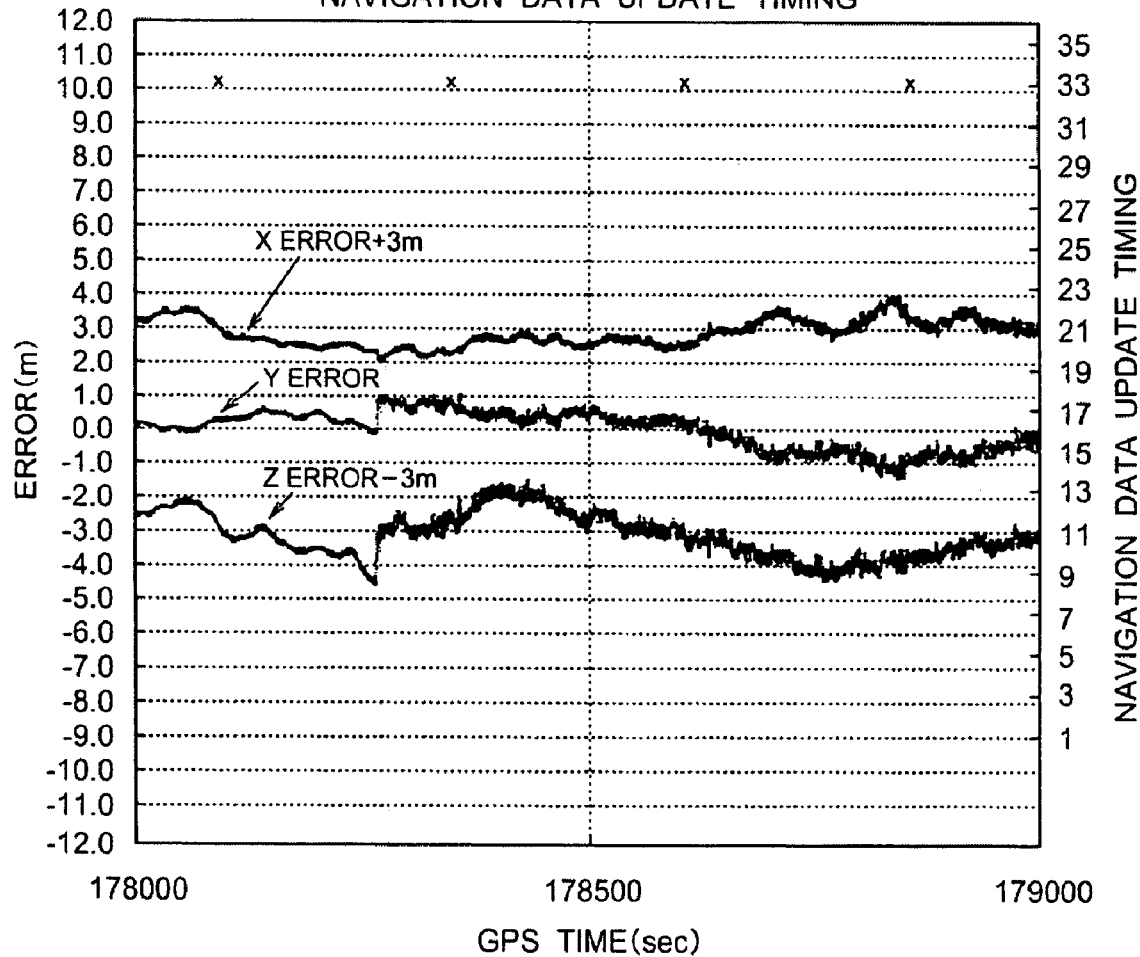

SBAS NAVIGATION DATA UPDATE NOTIFYING SYSTEM AND METHOD USED IN GBAS

CROSS-REFERENCE TO RELATED APPLICATION

This application is based upon and claims the benefit of priority from Japanese patent application No. 2008-099479, filed on Apr. 7, 2008, the disclosure of which is incorporated herein in its entirety by reference.

BACKGROUND OF THE INVENTION

1. Field of the Invention

The present invention relates to an SBAS navigation data update notifying system and method used in a ground based augmentation system (GBAS), which can improve the safety by avoiding deterioration in a positioning accuracy caused because SBAS data used in a ground system and in an airborne system which configure the GBAS are different.

2. Description of the Related Art

There have been conducted operations of systems which use four or more navigation satellites for navigations of flying objects such as airplanes (Japanese Unexamined Patent Publication 2000-275317: Patent Document 1, Japanese Unexamined Patent Publication 2003-18061: Patent Document 2, Japanese Unexamined Patent Publication 5-234000: Patent Document 3, and Japanese Unexamined Patent Publication 2004-198291: Patent Document 4).

When the flying objects are airplanes, high safety and reliability are required. In order to meet such demands, it is necessary to satisfy the accuracy, absoluteness, and continuity as well as the availability of the service. However, the four factors cannot be satisfied with a navigation system which uses only a GPS satellite but uses no augmentation system. Therefore, it is necessary to have an augmentation system.

A ground based augmentation system (GBAS) has been proposed as such augmentation system. The GBAS is configured with a ground system, an airborne system, and navigation satellites (GPS satellite and SBAS satellite). The ground system collects data from the navigation satellites by a plurality of reference stations placed within an airport, estimates an error contained in ranging signals from the navigation satellites, and transmits it to the airborne system. The airborne system uses correction data received from the ground system to correct the ranging signals received at the airborne system so as to conduct differential positioning, calculates the displacement from a regulated flight path, and provides it to pilots.

GBAS Type 1 data specification is depicted in SARPs Annex 10 (International Standards and Recommended Practices: referred to as SARPs hereinafter). Note here that SARPs Annex 10 is the International Standards regarding radio navigation devices issued by ICAO (International Civil Aviation Organization). When the GBAS Type 1 generated by a standard designing method based on the specification is used, it is not possible for the airborne system side to know the GBAS navigation data that is used when the ground system generates the GBAS type 1 data.

Therefore, at the timing where the SBAS navigation data is updated, the airborne system comes to use the SBAS navigation data that is different from the one used by the ground system when generating the GBAS type 1 data. The SBAS navigation data is the data used for calculating the satellite position of the SBAS satellite and time correction amount. Thus, use of different data in the ground system and in the airborne system leads to deteriorating the positioning accuracy. The GBAS is a system used in navigations of the airplanes, so that deterioration of the positioning accuracy may endanger people's lives. Therefore, it is necessary to avoid such case.

In order to perform the differential correction with high precision, it is necessary for the SBAS navigation data used by the ground system when generating the correction data to be the same as the SBAS navigation data used by the airborne system for the positioning.

In the GBAS Type 1 data transmitted from the ground system to the airborne system, there are fields such as a field for storing correction data for the ranging signal, a field for storing information regarding absoluteness, and an IOD field for specifying the navigation data used when the ground system generates the correction data.

It is so regulated in the regulation of the SARPs that IODE within the GPS navigation data is set in the IOD field when the correction-target satellite is the GPS satellite. With this, the airborne system can specify the GPS navigation data used by the ground system. Meanwhile, it is so defined in the SARPs that 1 (1111 1111) is set for all the IOD fields when the correction-target satellite is the SBAS satellite. Therefore, when the correction-target satellite is the SBAS satellite, the airborne system cannot specify the SBAS navigation data that is used by the ground system.

For solving the above-described problems, it is considered to apply a navigation system described in Patent Document 1. Patent Document 1 is directed to a wide-range positioning system which employs a GPS navigation system that uses only a GPS satellite. Patent Document 2 discloses a technique which transmits correction data towards an airplane from a ground system via a stationary satellite, and the airplane receives the correction data and determines the position of the airplane itself accurately.

As described above, Patent Document 1 discloses the system which uses only the GPS satellite, so that the target satellite that receives information is limited to the GPS satellite. Thus, it is not the technique which controls the navigation by using different types of systems as proposed in the present invention, so that it is unnecessary in that case to monitor the update of the navigation data of the SBAS satellite. Therefore, with Patent Document 1, it is not necessary to notify the airborne system that the SBAS navigation data has been updated by adding such information to the correction data transmitted from the ground system.

Thus, there is no necessity to apply the technique of Patent Document 1 to the GBAS system that is configured with the GBAS ground system and the GBAS airborne system.

SUMMARY OF THE INVENTION

An exemplary object of the present invention is to provide an SBAS navigation data update notifying system and method used in GBAS, which can improve the safety by avoiding deterioration in a positioning accuracy through using the same navigation data in a ground system and in an airborne system by employing a satellite navigation augmentation system (GBAS: Ground Based Augmentation System).

In order to achieve the foregoing exemplary object, the SBAS navigation data update notifying system used in GBAS according to an exemplary aspect of the invention is an SBAS satellite navigation data update notifying system loaded on a ground based augmentation system which uses a GPS satellite and an SBAS satellite as navigation satellites and utilizes information from the navigation satellites for navigation. The SBAS navigation data update notifying system includes: a ground system which estimates errors contained in ranging signals received from the navigation satellites, and formats and transmits correction information for correcting the estimated errors; and an airborne system which performs calculation of differential GPS positioning based on information provided from the navigation satellites and the formatted correction information, and displays a displacement from a regulated route. The ground system has a notifying device which notifies update by adding information regarding the update of navigation data to the correction information, when SBAS satellite navigation data used for generating the correction information is updated. The airborne system has a detecting device which detects an update notification of the SBAS satellite navigation data that is transmitted from the ground system, and a calculating device which performs calculation of the differential GPS positioning by switching the navigation data to the updated navigation data when detecting the update of the SBAS satellite navigation data.

The SBAS navigation data update notifying method used in GBAS according to another exemplary aspect of the invention is an SBAS satellite navigation data update notifying method in a ground based augmentation system which uses a GPS satellite and an SBAS satellite as navigation satellites and utilizes information from the navigation satellites for navigation. The SBAS navigation data update notifying method includes: estimating errors contained in ranging signals received from the navigation satellites, formatting correction information for correcting the estimated errors, adding information regarding update of navigation data to the correction information, when SBAS satellite navigation data used for generating the correction information is updated, and notifying the information to an airborne system from a ground system; and on the airborne system side, detecting an update notification of the SBAS satellite navigation data that is transmitted from the ground system, and performing calculation of GPS positioning by switching the navigation data to the updated navigation data when detecting the update of the SBAS satellite navigation data.

BRIEF DESCRIPTION OF THE DRAWINGS

FIG. 5 is an illustration for describing transition of the states carried out by a navigation data managing unit;

FIG. 6 is an illustration for describing the states managed by the navigation data managing unit and for showing the SBAS navigation data used by a positioning calculating unit in each state;

FIG. 7 is an illustration showing a simulation result of the positioning accuracy, when the SBAS navigation data used in a ground system and the SBAS navigation data used in an airborne system are inconsistent; and FIG. 8 is an illustration showing a simulation result of the positioning accuracy, when the SBAS navigation data used in the ground system and the SBAS navigation data used in the airborne system are consistent.

DETAILED DESCRIPTION OF THE EXEMPLARY EMBODIMENTS

Hereinafter, exemplary embodiments of the invention will be described in detail by referring to the accompanying drawings.

Figure 1:
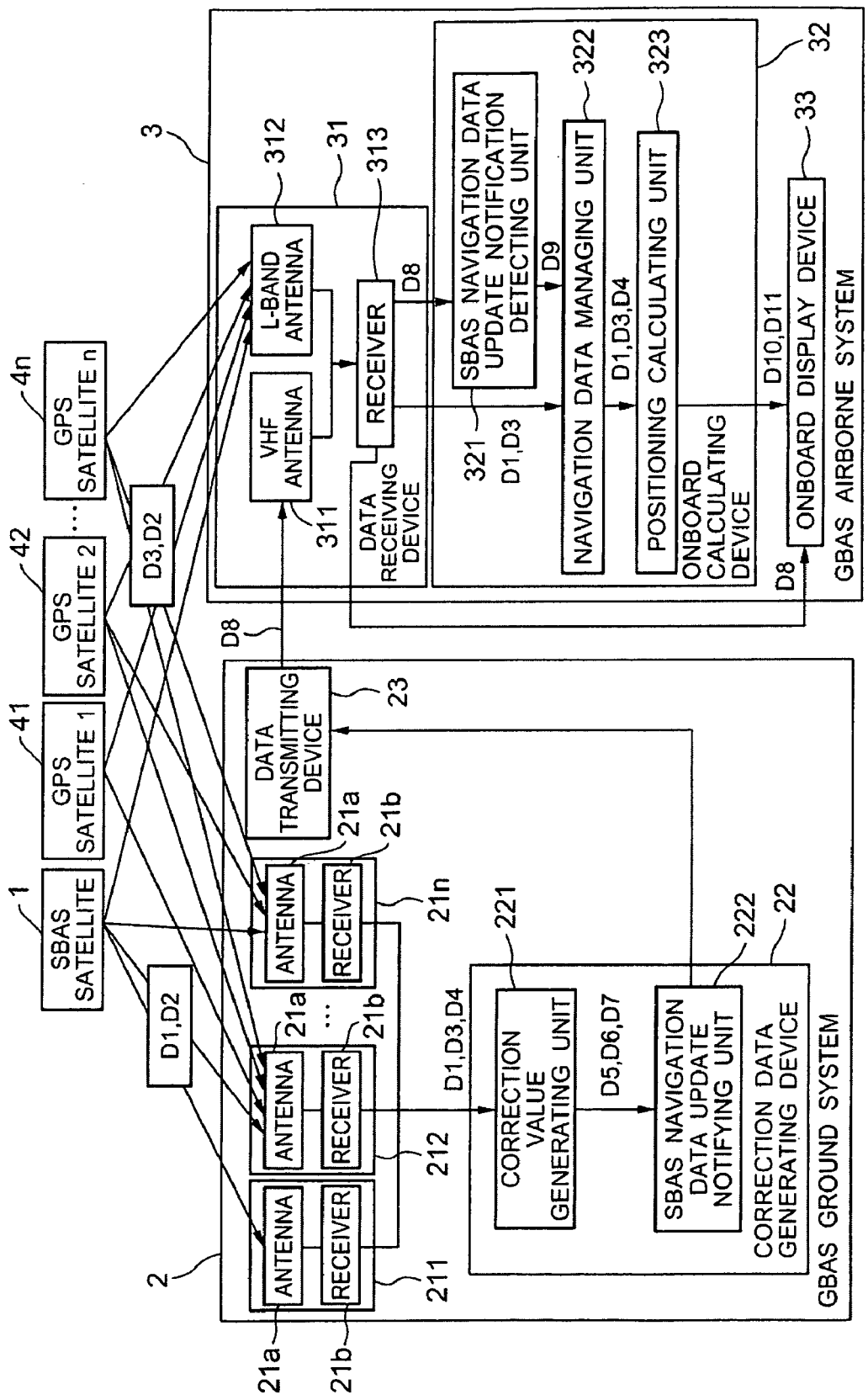
FIG. 1 is a block diagram showing a navigation data update notifying system according to an exemplary embodiment of the invention.

As shown in FIG. 1, an SBAS navigation data update notifying system in GBAS according to the exemplary embodiment of the invention is a navigation data update notifying system loaded in a ground based augmentation system which utilizes information provided from an SBAS satellite 1 and GPS satellites 41-4n. As a basic structure, the SBAS navigation data update notifying system includes: a ground system 2 which estimates errors contained in ranging signals D2 received from the satellites, and formats and transmits correction information for correcting the estimated errors; and an airborne system 3 which calculates differential GPS positioning based on the ranging signals and the formatted correction information, and displays the displacement from a regulated route.

Further, the ground system 2 has a notifying device which adds the update of the navigation data to the correction information for notifying it to the airborne system 3, when the SBAS satellite navigation data used when generating the correction information is updated. The airborne system 3 has a detecting device which detects the notification of the navigation data update that is transmitted from the ground system, and a calculating device which calculates the differential GPS positioning by switching the data to the updated navigation data when detecting the notification of the navigation data update.

In this exemplary embodiment, errors contained in the ranging signals received from the satellites are estimated, formats the correction information for correcting the estimated errors, the update of the of the navigation data is added to the correction information for notifying it to the airborne system 3 when the SBAS satellite navigation data used when generating the correction information is updated, and such information is notified to the airborne system from the ground system. The airborne system detects the notification of the navigation data update transmitted from the ground system, and calculates the differential GPS positioning by switching the data to the updated navigation data when detecting the notification of the navigation data update.

As shown in FIG. 1, the exemplary embodiment of the invention will be described in a more concretive manner by referring to a case where the exemplary embodiment of the invention is applied to a GBAS (Ground Based Augmentation System) which uses the GPS satellites 41-4n and the SBAS satellite 1 as the navigation satellites.

The exemplary embodiment of the invention shown in FIG. 1 is designed to improve the safety by avoiding deterioration in the positioning accuracy caused because the SBAS navigation data used in the ground system and the SBAS navigation data used in the airborne system 3 are different, through making the SBAS navigation data used when the ground system 2 generates the correction information consistent with the SBA navigation data used in the airborne system 3 by adding a function of notifying the update timing of the SBAS navigation data to the GBAS ground system 2 and adding a function of detecting the update notification from the ground system 2 to the GBAS airborne system 3 of the GBAS system that is an augmentation system for allowing the GPS satellites and the SBAS satellite to be used for the navigations of airplanes. The SBAS navigation data is navigation data broadcasted by the SBAS satellite, which is used for calculating the position of the SBAS satellite and clock errors.

In FIG. 1, the GBAS ground system 2 receives SBAS navigation data D1 from the SBAS satellite 1, GPS navigation data D3 from the GPS satellites 41-4n, and the ranging signals D2 from the SBAS satellite and the GPS satellites, estimates errors contained in the ranging signals D2, and transmits it to the GBAS airborne system 3 as GBAS Type 1 data D8. When the SBAS navigation data is updated, it is necessary to notify the update. Therefore, the ground system 2 has a notifying device (222) for notifying the update of the SBAS navigation data.

Figure 2:
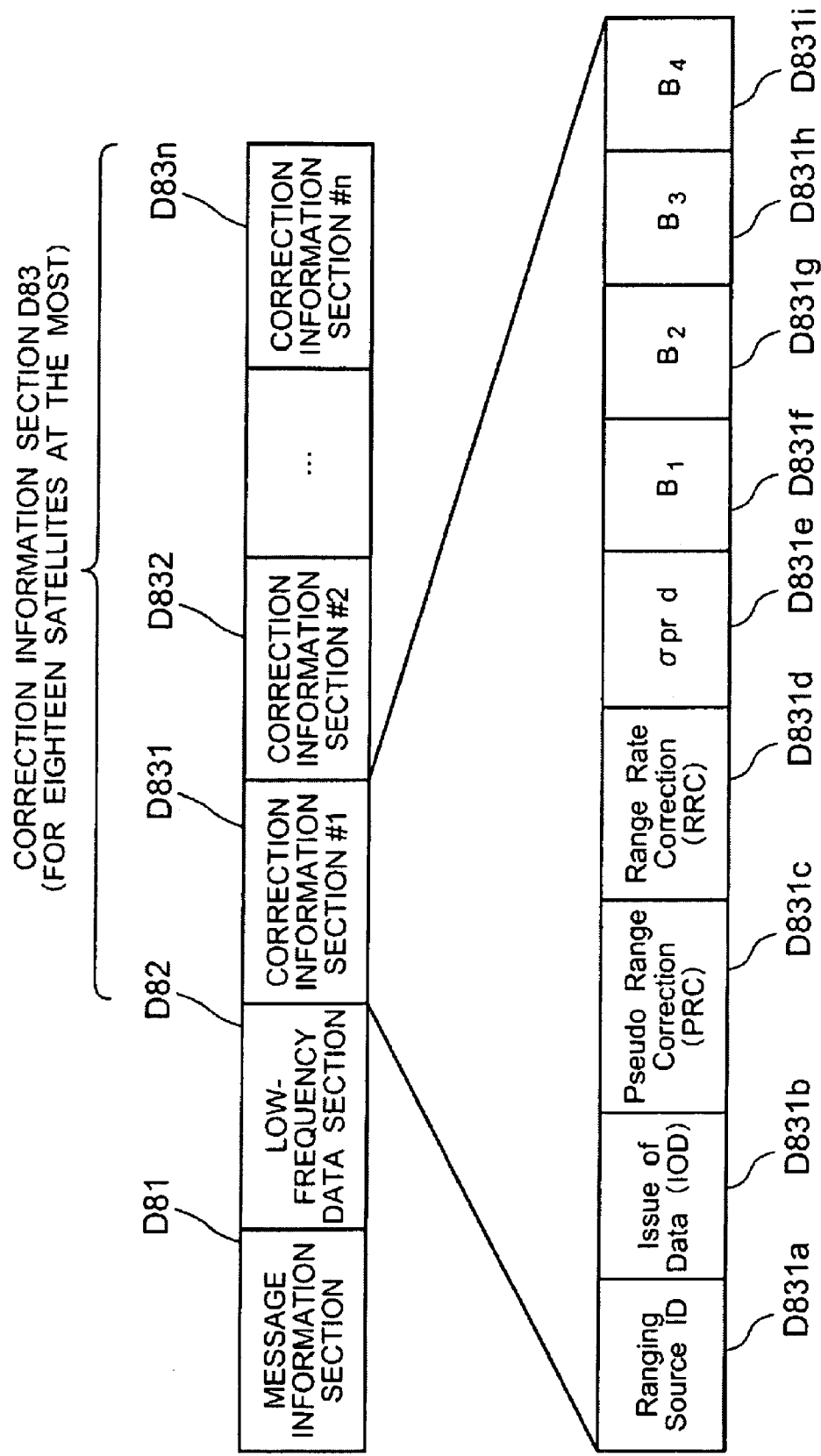
FIG. 2 is an illustration showing a structure of GBAS Type 1 data.

The notifying device notifies the update of the SBAS navigation data by utilizing correction information section #1 field D831 that is the head of correction information section D83 of the GBAS Type 1 data shown in FIG. 2. Specifically, the notifying device 2 notifies the update of the SBAS navigation data by setting the correction information for the GPS satellite in the correction information section #1 field 831 when there is no update in the SBAS navigation data and setting the correction information for the SBAS satellite only when the SBAS navigation data is updated.

The airborne system 3 performs positioning calculation through conducting the differential correction on the errors contained in the ranging signals D2 from the SBAS satellites and the GPS satellite by using the GBAS Type 1 data D8 received from the ground system 2 to calculate the position of the system itself with high precision. When performing the positioning calculation, it is necessary to use the SBAS navigation data that is the same as the SBAS navigation data that is used when the ground system 2 generates the GBAS Type 1 data D8. Thus, the airborne system 3 has the detecting devices (321, 322) for detecting the update of the SBAS navigation data and the calculating device (323). When the correction information section #1 field D831 of the GBAS type 1 data D8 received from the ground system 2 is the correction data for the SBAS satellite, the detecting device judges that the SBAS navigation data used in the ground system 2 has been updated, and detects the update notification. Further, the detecting device manages the two generations of old and new SBAS navigation data, and transmits the old-generation SBAS navigation data to the calculating device during a period until detecting the update notification even if the SBAS navigation data received by the airborne system 3 is updated.

Upon detecting the update notification, the detecting device transmits the new-generation SBAS navigation data to the calculating device, and discards the old-generation SBAS navigation data. The calculating device performs the calculation of the differential GPS positioning by using the SBAS navigation data inputted from a navigation data managing function, and calculates a displacement from the regulated route. The positioning calculation result and the displacement from the regulated route are displayed on an onboard display device 33 to be presented to the pilot.

As described above, it is possible with the exemplary embodiment of the invention to make the SBAS navigation data used when the ground system 2 generates the correction information (GBAS Type 1 data D8) consistent with the SBAS navigation data used by the airborne system 3 for the positioning. Therefore, deterioration in the positioning errors caused due to the inconsistency of the used SBAS navigation data can be avoided.

Next, a case of applying the preferred embodiment of the invention to a GBAS system which uses the GPS satellites and the SBAS satellite shown in FIG. 1 for the navigations of the airplanes will be described as a first exemplary embodiment.

As shown in FIG. 1, the navigation data update notifying system according to the first exemplary embodiment of the invention includes the SBAS satellite 1, the GBAS ground system 2, the GBAS airborne system 3, and the GPS satellites 41-4n.

The SBAS satellite 1 is a stationary satellite, and it broadcasts the SBAS navigation data D1 and the ranging signal D2. The SBAS navigation data D1 is data used for calculating the position of the SBAS satellite 1 and the clock errors. The ranging signal D2 is a signal for measuring a pseudorange between the SBAS satellite 1 and a user. The measured distance is called a pseudorange. In this case, the airborne system 3 that moves by being loaded on an airplane or the like corresponds to the user. The pseudorange measured based on the ranging signal D2 contains a satellite orbit error, a satellite clock error, an ionosphere delay error, and a troposphere delay error generated when a signal passes the ionosphere and the troposphere.

The GPS satellites 41-4n broadcast the GPS navigation data D3 and the ranging signals D2. The navigation data D3 and the ranging signals D2 are the same as those of the SBAS navigation data D1 and the ranging signal D2 broadcasted from the SBAS satellite 1.

The GBAS ground system 2 includes reference stations 211-21n, a correction data generating device 22, and a data transmitting device 23.

The reference stations 211-21n receive the SBAS navigation data D1 and the ranging signal D2 broadcasted from the SBAS satellite 1 as well as the GPS navigation data D3 and the ranging signals D2 broadcasted from the GPS satellites 41-4n at antennas 21a, respectively, and transmits the received signals to the correction data generating device 22 by receivers 21b. The received signals contain the SBAS navigation data D1, the ranging signals D2, and the GPS navigation data D3.

The correction data generating device 22 includes a correction value generating unit 221, and an SBAS navigation data update notifying unit 222. The correction value generating unit 221 estimates the errors contained in the ranging signals D2 of each of the satellites 1, and 41-4n based on the navigation data D1, D3, and the ranging signals D2 broadcasted from each of the satellites 1 and 41-4n. When the SBAS navigation data D1 broadcasted from the SBAS satellite 1 is updated, the SBAS navigation data update notifying unit 222 adds information for notifying the update to the GBAS Type 1 data D8. The method for generating the information for notifying the update will be described later. The data transmitting device 23 performs digital modulation on the GBAS Type 1 data D8 generated by the correction data generating device 22, and transmits it to the GBAS airborne system 3 by VHF band.

The GBAS airborne system 3 moves by being loaded on an airplane or the like, and it includes a data receiving device 31, an onboard calculating device 32, and an onboard display device 33.

The data receiving device 31 includes a VHF antenna 311, an L-band antenna 312, and a receiver 313. The VHF antenna 311 receives the GBAS Type 1 data D8 transmitted from the GBAS ground system 2. The L-band antenna 312 receives the navigation data D1, D3, and the raging signals D2 broadcasted from the SBAS satellite 1 and the GPS satellites 41-4n. The receiver 313 transmits the signal data received by the antennas 311 and 312 to the onboard calculating device 32.

The onboard calculating device 32 includes an SBAS navigation data update notification detecting unit 321, a navigation data managing unit 322, and a positioning calculating unit 323.

The SBAS navigation data update notification detecting unit 321 detects the SBAS navigation data update notification (GBAS Type 1 data D8) transmitted from the GBAS ground system 2, and sends update notification D9 indicating that it has detected the SBAS navigation data update notification to the navigation data managing unit 322. The navigation data managing unit 322 receives inputs of the SBAS navigation data D1 and the GPS navigation data D3 transmitted from the data receiving device 31, and manages the two generations of the old and new SBAS navigation data D1. The two generations of old and new navigation data D1 contain the SBAS navigation data D1 that is the data when the previous SBAS navigation data update is notified, and the latest SBAS navigation data D1 received by the data receiving device 31. Further, the navigation data managing unit 322 judges the SBAS navigation data D1 to be used based on the SBAS navigation data D1 received at the L-band antenna 312 and the update notification D9 transmitted from the SBAS navigation data update notification detecting unit 321, and sends the judged SBAS navigation data D1 to the positioning calculating unit 323. The positioning calculating unit 323 performs calculation of the differential GPS positioning by using the ranging signals D2 from the SBAS satellite 1 and the GPS satellites 41-4n and the GPS navigation data D3 from the GPS satellite received by the data receiving device 31, the GBAS Type 1 data D8 transmitted from the GBAS ground system 2 and the SBAS navigation data D1 transmitted from the navigation managing unit 322 received by the data receiving device 31, so as to calculate the displacement from the regulated route of the airplane or the like to which the airborne system 3 is loaded.

The onboard display device 33 displays positioning calculation result D10 and displacement D11 from the regulated route which are calculated by the onboard calculating device 32 on a screen so as to provide necessary information to the pilot. The displacement D11 is the displacement with respect to the regulated route of the airplane or the like to which the above-described airborne system 3 is loaded.

Next, operations of the navigation data update notifying system according to the first exemplary embodiment of the invention will be described in detail. As the basic structure, the navigation data update notifying system according to the first exemplary embodiment notifies the update of the SBAS navigation data from the GBAS ground system 2 to the GBAS airborne system 3, and the GBAS airborne system 3 detects the notification so that the SBAS navigation data used in the ground system 2 and the SBAS navigation data used in the airborne system 3 can be made consistent. Hereinafter, the operations will be described in a more concretive manner.

The receivers 21b of the reference stations 211-21n measure pseudoranges D4 between the satellites 1, 41-4n and the reference stations 211-21n based on the ranging signals D2 which are broadcasted from the SBAS satellite 1 and the GPS satellites 41-4n and received at the antennas 21a, and send the measured pseudoranges D4 to the correction data generating device 22 along with the received SBAS navigation data that is broadcasted from the SBAS satellite 1 and the received GPS navigation data D3 broadcasted from the GPS satellites 41-4n.

The correction value generating unit 221 of the correction data generating device 22 calculates the distances between the satellites 1, 41-4n and the reference stations 211-21n geometrically, estimates the errors contained in the pseudoranges D4 by using the calculated distances and the pseudoranges D4, and determines pseudorange correction values D5 required for correcting the estimated errors. The correction value generating unit 221 calculates the geometrical distances based on the positions of the satellites 1, 41-4n calculated from the navigation data D1, D3 and the known positions of the reference stations 211-21n. The calculating method thereof is a typical method, so that the detailed explanations are omitted.

The correction value generating unit 221 calculates the pseudorange correction values D5 for all the satellites 1, 41-4n which are observed in common by a plurality of reference stations 211-21n, and sends the calculated data to the SBAS navigation data update notifying unit 222. When sending the pseudorange correction values D5, the correction value generating unit 221 adds an identifier D6 of the SBAS navigation data D1 and an identifier D7 of the GPS navigation data D3 used when calculating the pseudorange values D5, and sends those to the SBAS navigation data update notifying unit 222. In an actual GBAS, it is necessary to generate some pieces of information other than the pseudorange correction values D5. However, processing for generating such information is not relevant to the present invention, so that the explanations thereof are omitted.

Figure 3:
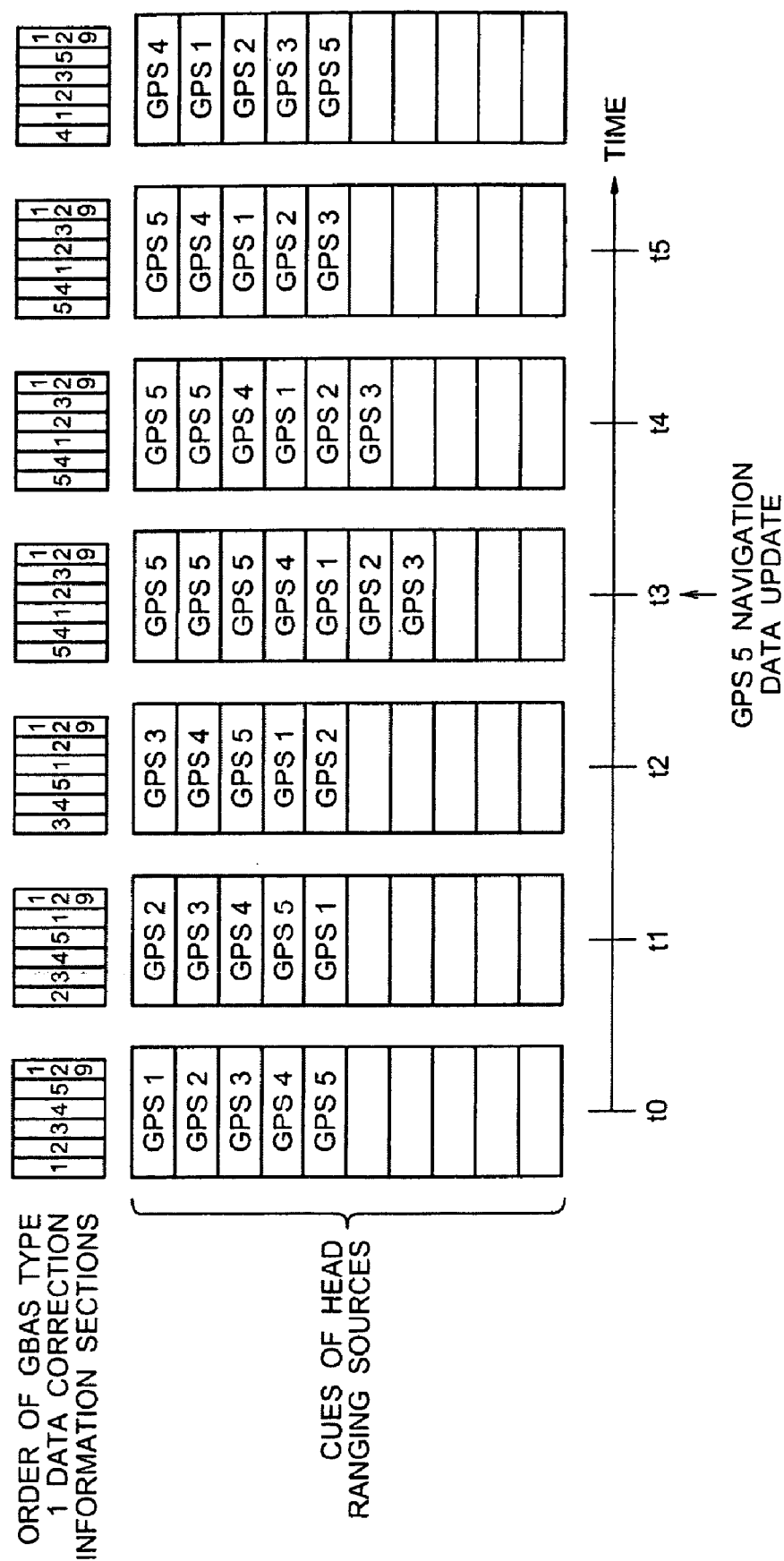
FIG. 3 is an illustration for describing head correction information control performed by an SBAS navigation data update notifying unit, when GPS navigation data is updated.

The SBAS navigation data update notifying unit 222 formats the correction values D5 and generates the GBAS Type 1 data D8 according to the regulation of the SARPs, and sends the data D8 to the data transmitting device 23. Here, the GBAS Type 1 data D8 is so generated that the update of the data can be notified to the GBAS airborne system 3 when the SBAS navigation data is updated. FIG. 2 and FIG. 3 illustrate a case where the SBAS navigation data update notifying unit 222 notifies the update of the SBAS navigation data by utilizing the GBAS Type 1 data D8.

First, an outline of the GBAS Type 1 data D8 will be described. FIG. 2 shows the contents of the GBAS Type 1 Data D8 defined in SARPs. As shown in FIG. 2, the GBAS Type 1 data D8 is roughly classified into message information section D81, low-frequency data section 82, and correction information section 83. The correction information section D83 can contain the correction information for the eighteen satellites 1, 41-4n at the most. The contents of the correction information will be described later. In FIG. 2, it is assumed that the SBAS navigation data update notifying unit 222 sends the correction information for the n-number of satellites, and correction information section #1 D831—correction information #n D83n are set as the areas for containing the correction information. The SBAS navigation data update notifying unit 222 includes nine kinds of data D831a-D831i in the correction information section #1 D831 as in FIG. 2. The SBAS navigation data update notifying unit 222 sets, in a Ranging Source ID field D831a, a PRN number (satellite number) of the satellite that is the target of the correction information contained in the correction information section #1 D831. When sending the correction information for the SBAS satellite, the SBAS navigation data update notifying unit 222 sets all 1 (1111 1111) in IOD field D831b for the identifier D7 for the GPS navigation that is received from the correction value generating unit 221 when sending the correction information for the GPS satellite. The SBAS navigation data update notifying unit 222 sets the pseudorange correction values (correction information) D5 calculated by the correction value generating unit 221 to PRC field B831c. Other data fields are irrelevant to the present invention, so that the explanations thereof are omitted.

Next, the relation between the low-frequency data section D82 and the correction information section D83 will be described. As the low-frequency data section D82, there is only the area set for one satellite. Thus, the SBAS navigation data update notifying unit 222 stores, in the low-frequency data section D82, the information regarding the satellite of the correction information section #1 D831 that is the head of the correction information section D83. Hereinafter, the correction information section #1 D831 that is the head data of the correction information section D83 is called a head correction information section. In order to transmit the low-frequency data to the plurality of satellites, the SBAS navigation data update notifying unit 222 rotates the information in the correction information section D83 so that information of each satellite comes at the head correction information section in order. Further, for the satellite whose target navigation data is updated, it is necessary to send the low-frequency data by giving preference to that satellite over the others. Thus, the SBAS navigation data update notifying unit 222 generates an interruption to the regular rotation to put the satellite whose navigation data is updated into the head correction information section #1 D831. FIG. 3 shows this state. FIG. 3 shows the case where the five GPS satellites 41, 42, 43, 44, 45 and one SBAS satellite 1 are observed. In FIG. 3, the GPS satellite 41 is expressed as GPS 1, the GPS satellite 42 as GPS 2, the GPS satellite 43 as GPS 3, the GPS satellite 44 as GPS 4, and the GPS satellite 45 as GPS 5. Further, the SBAS satellite is expressed as 129.

FIG. 3 shows the state where the five GPS satellites and one SBAS satellite are observed, and the navigation data for the GPS 5 is updated at time t3. The SBAS navigation data update notifying unit 222 manages the satellites to be set in the head correction information section #1 D831 with queues of head ranging sources. At time t0-t2, there is no update of the navigation data for any of the satellites, so that the head correction information is stored in order of the GPS 1, the GPS 2, and the GPS 3. Then, the SBAS navigation data update notifying unit 222 sets the satellite set in the head correction information to the rearmost of the queue at next time so that the all satellites come as the head again after becoming the head once. In this exemplary embodiment, the correction for the SBAS satellite is not included in the rotation. This is because the head correction information section #1 D831 is used for notification of the update of the SBAS navigation data which will be described later.

When the navigation data of the GPS 5 is updated at time t3, the SBAS navigation data update notifying unit 222 has the GPS 5 interrupted into the three heads of the queues so that the GPS 5 comes as the head correction information for three consecutive times. The SBAS navigation data update notifying unit 222 judges about the update of the navigation data for the GPS satellites based on the GPS navigation data identifiers D7 received from the correction value generating unit 221. The GPS 5 is set as the heads for three consecutive times according to the regulation of the SARPs for the case of the GPS navigation data update. In order to return the queues having three GPS 5 to the normal queues having one each of the satellites, the SBAS navigation data update notifying unit 222 eliminates the GPS 5 that is in the head of the queue set at a previous time without returning it to the end of the queue at the time t4 and t5.

Figure 4:
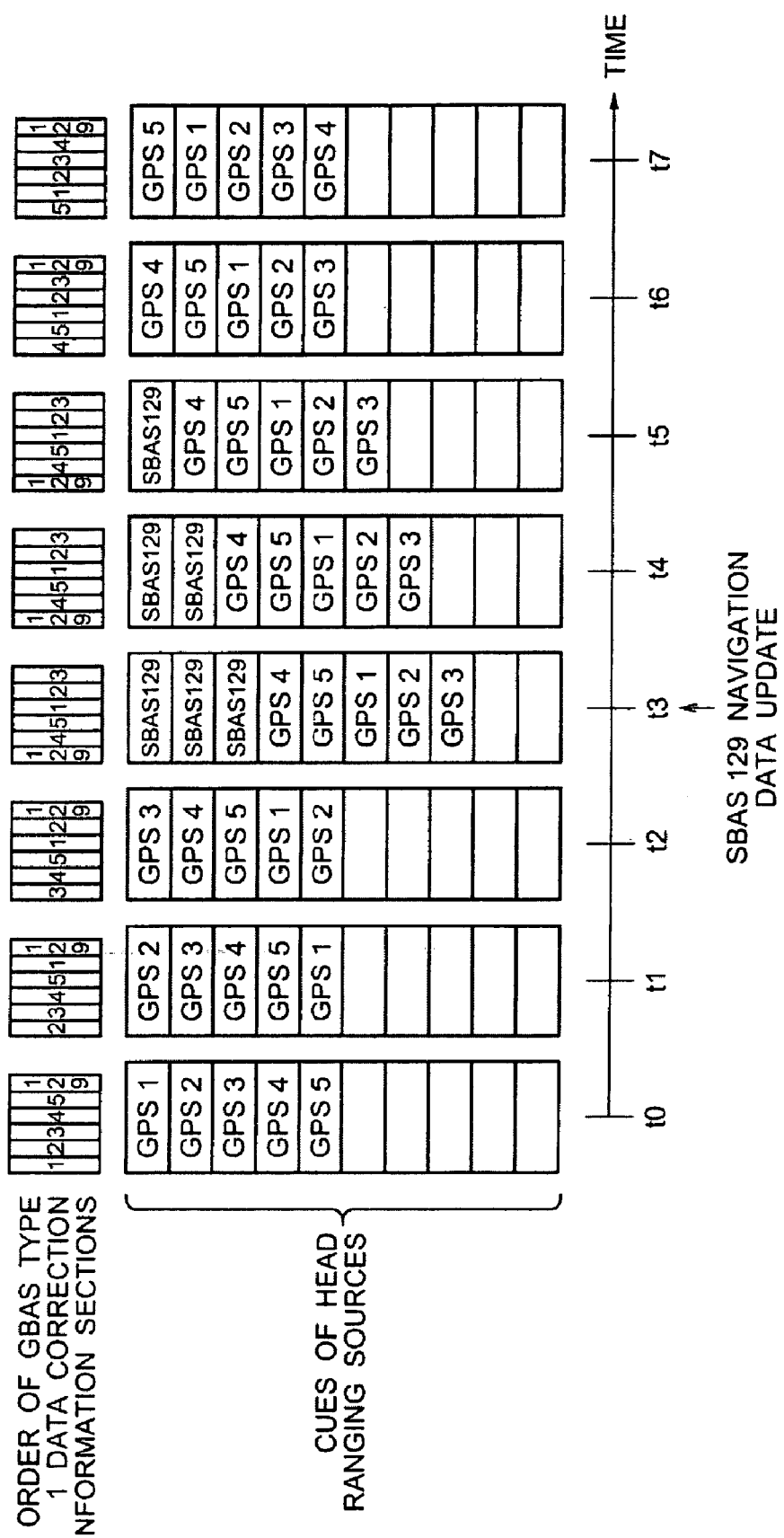
FIG. 4 is an illustration for describing head correction information control performed by the SBAS navigation data update notifying unit, when the SBAS navigation data is updated.

Next, described is the processing executed by the SBAS navigation data update notifying unit 222 when the SBAS navigation data that is the navigation data for the SBAS satellite is updated. FIG. 4 is the case where the five GPS satellites and one SBAS satellite are observed, as in the previous case. In FIG. 3, the GPS satellite 41 is expressed as GPS 1, the GPS satellite 42 as GPS 2, the GPS satellite 43 as GPS 3, the GPS satellite 44 as GPS 4, and the GPS satellite 45 as GPS 5. Further, the SBAS satellite is expressed as 129.

FIG. 4 shows the case where the SBAS navigation data is updated at time t3. In FIG. 4, the SBAS 129 is the SBAS satellite. As in the previous case, the GPS 1-GPS 3 come as the head correction information in order at time t0-time t2. As in the previous case, the SBAS satellite is not included in the normal rotation.

When the SBAS navigation data of the SBAS 129 is updated at time t3, the SBAS navigation data update notifying unit 222 has the SBAS satellite that has not been included in the rotation interrupted into the three heads of the queues so that the SBAS 129 becomes the head correction information for three consecutive times. The SBAS navigation data update notifying unit 222 judges about the update of the navigation data for the SBAS satellites based on the SBAS navigation data identifiers D6 received from the correction value generating unit 221. The SBAS 129 is set as the heads for three consecutive times by considering the case where the GBAS airborne system 3 fails for some reasons to receive the GBAS Type 1 data D8 in which the SBAS 129 is the head correction information. The SBAS navigation data update notifying unit 222 eliminates the SBAS 129 that is in the head of the queue at a previous time without returning it to the end of the queue at the time t4-time t6, and returns to the normal queue having no SBAS 129 within the queue at time t6. The SBAS navigation data update notifying unit 222 returns to the rotation with only the GPS satellites at time 7 and thereafter, as in the case of time t0-time t3.

As described, when the SBAS navigation data is updated, the SBAS navigation data update notifying unit 222 notifies the update of the SBAS navigation data through setting the SBAS satellite in the head correction information section. The GBAS Type 1 data D8 generated by the SBAS navigation data update notifying unit 222 is sent to the GBAS airborne system 3 from the data transmitting device 23.

The data receiving device 31 has the two antennas, i.e., the VHF antenna 311 and the L-band antenna 312. The VHF antenna 311 receives the data from the ground system 2, and the L-band antenna 312 receives the signals from the SBAS satellite 1 and the GPS satellites 41-4n, respectively. The data received at the two antennas 311 and 312 are sent to the onboard calculating device 32 via the receiver 313.

The SBAS navigation data update notification detecting unit 321 detects the update notification of the SBAS navigation data from the PRN number stored in the Ranging Source ID field D831a of the head correction information section of the GBAS Type 1 data D8 that is sent from the data receiving device 31. The SBAS navigation data update notification detecting unit manages the two PRN numbers (previous and current numbers), and judges that the SBAS navigation data has been updated when the PRN number obtained this time is that of the SBAS satellite and it is different from the previous PRN number. The latter condition (the current PRN number is different from the previous PRN number) occurs because the update notifications are sent from the GBAS ground system 2 for three consecutive times when the SBAS navigation date is updated, as it has been described above. When detecting the update, the SBAS navigation data update notification detecting unit 321 sends the update notification to the navigation data managing unit 322.

Next, the update notification to the navigation data managing unit 322 will be described. The navigation data managing unit 322 manages the five states of the two generations of old and new SBAS data shown in FIG. 6. The update notification to the navigation data managing unit 322 performs state transitions between each of the states of FIG. 6 while having reception of the SBAS navigation data and reception of the update notification D9 as two events, and sends the navigation data to be used according to the state to the positioning calculating unit 323. FIG. 5 shows the state transitions for the events generated in each state. Regarding the state transitions, the transition at a normal state will be described first, and other transitions will be described thereafter.

First, the transition of the normal state will be described by referring to FIG. 5. When the SBAS navigation data is received in an initial state where no SBAS navigation data of two generations are present, the navigation data managing unit 322 registers it as a new generation SBAS navigation data. At this time, the navigation data managing unit 322 has not received the update notification D9 from the SBAS navigation data update notification detecting unit 321, so that it does not use the SBAS navigation data registered as the new-generation data and waits for the update notification. When receiving the update notification D9 in this state, the navigation data managing unit 322 transits to a state S3, and judges that it is possible to use the new-generation SBAS navigation data. When new SBAS navigation data is received in the state S3, the navigation data managing unit 322 registers the SBAS navigation data received anew as the new-generation data, shifts the SBAS navigation data registered as the new-generation data up to that point as an old-generation data, and transits to a state S4. In the state S4, the navigation data managing unit 322 continues the use of the old-generation SBAS navigation data since it has not received an update notification for the new-generation SBAS navigation data. When receiving the update notification in the state S4, the navigation data managing unit 322 discards the old-generation SBAS navigation data, transits to the state S3, and starts the use of the new-generation SBAS navigation data.

Next, other transitions that are not described above will be described by referring to FIG. 5. When receiving the update notification in the initial state S where there is completely no SBAS navigation data, the navigation data managing unit 322 continues the state S because there is no usable GEO navigation data. When receiving SBAS navigation data in the state S2, the navigation data managing unit 322 discards the SBAS navigation data that is in a standby state for the update notification, and registers the SBAS navigation data received anew as the new-generation data and continues the state S2. When there is an update notification received in the state S3, it comes into a state where the airborne system 3 has not received new navigation data even though the ground system 2 has updated the SBAS navigation data. Thus, the navigation data managing unit 322 discards the new-generation SBAS navigation data to shift to a standby state for the SBAS navigation data, and transits to a state 5. In the state S5, there is no usable SBAS navigation data. When there is an update notification received in the state S5 in a standby state for the SBAS navigation data, it means that the ground system has updated the SBAS navigation data before the airborne system receives the SBAS navigation data. Thus, the navigation data managing unit 322 gives up to receive the navigation data it has been expected, and returns to the initial state S1. When there is the SBAS navigation data received in the state S4, it means that still newer SBAS navigation data is received before receiving the update notification for the new-generation SBAS navigation data. Thus, the navigation data managing unit 322 registers the received SBAS navigation data as new-generation data, and transits to the state S2.

The navigation data managing unit 322 sends the SBAS navigation data to be used to the positioning calculating unit 323 in accordance with the state determined by the transitions described above. The navigation data to be used in each state are as shown in FIG. 6.

Next, the positioning calculating unit 323 will be described. The positioning calculating unit 323 performs the differential corrections on the pseudoranges D4 from the SBAS satellite 1 and the GPS satellites 41-4n inputted from the receiver 313 by using the GBAS Type 1 data D8 transmitted from the ground system 2 to perform calculation of the differential GPS positioning for calculating the displacements from the regulated route, and sends the calculated displacements to the onboard display device 33. The positioning calculating unit 323 requires the position of the SBAS satellite when performing the calculation of the differential GPS positioning, so that the positioning calculating unit 323 uses the SBAS navigation data received from the navigation data managing unit 322, when calculating the position of the SBAS satellite. The onboard display device 33 displays the positioning calculation result D10 and the displacement D11 from the regulated route received from the positioning calculation unit 323 to provide the information to the pilot.

As described above, it is possible with the first exemplary embodiment to eliminate the deterioration in the positioning errors caused because the SBAS navigation data used in the ground system and the SBAS navigation data used in the airborne system are different. The reason for this is that the first exemplary embodiment enables the ground system and the airborne system to use the same SBAS navigation data through adding the function of notifying the update of the SBAS navigation data to the GBAS ground system and adding, to the GBAS airborne system, the function of detecting the update notification from the ground system and the function of managing the two generations of old and new SBAS navigation data and selecting the SBAS navigation data to be used for the positioning.

Next, effects of the first exemplary embodiment of the invention will be described with a simulation. FIG. 7 shows the result of positioning simulation of the airborne system before applying the first exemplary embodiment of the invention. In the simulation shown in FIG. 7, software to which the function of the onboard calculation device of the airborne system is implemented is operated on a PC (personal computer). In FIG. 7, the SBAS navigation data update timing is also plotted along with the positioning errors. In FIG. 7, "x" indicates the plot of the SBAS navigation data update timing. In this simulation, the satellite clock correction amount within the SBAS navigation data is changed more greatly than the actually observed satellite clock correction amount before and after the update of the SBAS navigation data in order to check the effects of the exemplary embodiment.

FIG. 7 shows the errors between the differential GPS positioning result obtained by the positioning calculation unit 323 of the onboard calculation device 32 and the known positions. If the calculated results of the errors are plotted as they are, three graphs come to overlap with one another. Thus, X-error is plotted by being offset by +3 m and Z-error is plotted by being offset by −3 m. As clear from FIG. 7, it can be seen that there are spike-like positional errors P generated in the positioning errors at the timing where the SBAS navigation data is updated, when the navigation data update notifying system according to the exemplary embodiment of the invention is not applied.

FIG. 8 shows the result when a simulation is conducted by applying the exemplary embodiment of the invention. Comparing FIG. 8 with FIG. 7, it can be seen that there is no spike-like positioning error generated at the timing of updating the SBAS navigation data. In FIG. 7, "x" indicates the plot of the SBAS navigation data update timing.

As clear from the results of the simulations shown in FIG. 7 and FIG. 8, it is possible with the first exemplary embodiment to eliminate the deterioration in the spike-like positioning errors caused because the SBAS navigation data used in the ground system for generating the correction data and the SBAS navigation data used in the airborne system for calculation of the differential GPS positioning are different, since the first exemplary embodiment enables the ground system and the airborne system to use the same SBAS navigation data through adding the function of notifying the update of the SBAS navigation data to the GBAS ground system and adding, to the GBAS airborne system, the function of detecting the update notification from the ground system and the function of managing the two generations of old and new SBAS navigation data and selecting the SBAS navigation data to be used for the positioning.

As an exemplary advantage according to the invention, it is possible to improve the safety by avoiding deterioration in a positioning accuracy caused because SBAS data used in a ground system and in an airborne system which configure the GBAS are different, through making the SBAS navigation data used in the ground system and the SBAS navigation data used in the airborne system consistent.

Next, a second exemplary embodiment of the invention will be described. The structure of the second exemplary embodiment is the same as that of the first exemplary embodiment described above, except that there are slight changes applied to the functions of the SBAS navigation data update notifying unit 222 of the GBAS ground system 2 and the SBAS update notification detecting unit 321 of the GBAS airborne system 3.

The second exemplary embodiment is designed to set the lower-order eight bits of time t0 contained in the SBAS navigation data D1 in the IOD field D831b of the GBAS Type 1 data D8 shown in FIG. 2 for allowing the ground system 2 and the airborne system 3 to use the same SBAS navigation data.

Time t0 of the SBAS navigation data D1 represents the time as the reference when applying the SBAS navigation data D1 (referred to as epoch), and the value thereof changes every time the SBAS navigation data D1 is updated. Thus, if time t0 can be notified, the SBAS navigation data D1 used in the ground system 2 and the SBAS navigation data D1 used in the airborne system 3 can be made consistent. However, the IOD field of the GBAS Type 1 data D8 is of eight bits, whereas time t0 of the SBAS navigation data D1 is of thirteen bits. Therefore, it is not possible in that state to set time t0 in the IOD field D831b.

Thus, in the second exemplary embodiment, the lower-order eight bits of time t0 are set in the IOD filed D831b.

In the second exemplary embodiment, only the lower-order eight bits out of the thirteen bits of time t0 are set. Thus, even though the lower-order eight bits are the same, the ninth bits and thereafter cannot be identified from those of the different time t0. However, time t0 whose ninth bit and thereafter are different is the time different at least by 4,096 seconds. Therefore, considering that the SBAS navigation data D1 is updated once in about 250 seconds with the current SBAS, there is almost no possibility of misjudging the SBAS navigation data D1 whose lower-order eighth bits of time t0 are the same and the ninth bit and thereafter are different as the same navigation data. The exemplary embodiment explained herein violates the demand of the SARPs to "set all 1 (1111 1111) in the IOD for the SBAS satellites". Therefore, while it is necessary to bring this issue to ICAO (International Civil Aviation Organization) that enacts SARPs so as to modify the demands of the SARPs, the structure of the exemplary embodiment can be achieved.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

INDUSTRIAL APPLICABILITY

The present invention can be applied to a system having the SBAS satellite as the correction target, which is a GBAS system that is an augmentation system for utilizing navigation satellites such as the GPS satellites and SBAS satellite for navigations of airplanes.

What is claimed is:

1. An SBAS navigation data update notifying system used in GBAS, which is an SBAS satellite navigation data update notifying system loaded on a ground based augmentation system which uses a GPS satellite and an SBAS satellite as navigation satellites and utilizes information from the navigation satellites for navigation, the SBAS navigation data update notifying system comprising:
a ground system which estimates errors contained in ranging signals received from the navigation satellites, and formats and transmits correction information for correcting the estimated errors; and
an airborne system which performs calculation of differential GPS positioning based on information provided from the navigation satellites and the formatted correction information, and displays a displacement from a regulated route, wherein:
the ground system has a notifying device which notifies update of navigation data, when SBAS satellite navigation data used for generating the correction information is updated, by adding information regarding the update of navigation data to the correction information,; and
the airborne system has a detecting device which detects an update notification of the SBAS satellite navigation data that is transmitted from the ground system, and a calculating device which performs calculation of the differential GPS positioning by switching the navigation data to the updated navigation data when detecting the update of the SBAS satellite navigation data.

2. The SBAS navigation data update notifying system used in GBAS as claimed in claim 1, wherein the notifying device has information for discriminating the SBAS satellite whose navigation data is updated interrupted and stored in a head position of a correction information section in data fields formatted for sending the correction information, and transmits the correction information.

3. The SBAS navigation data update notifying system used in GBAS as claimed in claim 1, wherein the detecting device detects an update notification of the navigation data for the SBAS satellite based on information stored in a head position of a correction information section in data fields formatted for sending the correction information.

4. The SBAS navigation data update notifying system used in GBAS as claimed in claim 1, wherein the detecting device manages navigation data of the SBAS satellite, and switches the navigation data by having reception of the navigation data broadcasted from the SBAS satellite and reception of the update notification of the navigation data as events.

5. The SBAS navigation data update notifying system used in GBAS as claimed in claim 1, wherein the calculating device measures pseudoranges from the ranging signals received from the GPS satellite and the SBAS satellite with the correction information transmitted from the ground system, performs differential correction on the errors contained in the measured pseudoranges, and calculates the differential GPS positioning based on the differential-corrected pseudoranges and the updated navigation data.

6. The SBAS navigation data update notifying system used in GBAS as claimed in claim 1, wherein the notifying device stores time information that becomes a reference when applying the navigation data from the SBAS satellite to data fields that are formatted for sending the correction information, and transmits the correction information.

7. The SBAS navigation data update notifying system used in GBAS as claimed in claim 1, wherein the detecting device detects an update notification of the navigation data from the SBAS satellite based on time information that becomes a reference when applying the navigation data from the SBAS satellite to data fields that are formatted for sending the correction information.

8. An SBAS navigation data update notifying method used in GBAS, which is an SBAS satellite navigation data update notifying method in a ground based augmentation system which uses a GPS satellite and an SBAS satellite as navigation satellites and utilizes information from the navigation satellites for navigation, the SBAS navigation data update notifying method comprising:

estimating errors contained in ranging signals received from the navigation satellites, formatting correction information for correcting the estimated errors, adding information regarding update of navigation data to the correction information, when SBAS satellite navigation data used for generating the correction information is updated, and notifying the information to an airborne system from a ground system; and on the airborne system side, detecting an update notification of the SBAS satellite navigation data that is transmitted from the ground system, and performing calculation of GPS positioning by switching the navigation data to the updated navigation data when detecting the update of the SBAS satellite navigation data.

9. An SBAS navigation data update notifying system used in GBAS, which is an SBAS satellite navigation data update notifying system loaded on a ground based augmentation system which uses a GPS satellite and an SBAS satellite as navigation satellites and utilizes information from the navigation satellites for navigation, the SBAS navigation data update notifying system comprising:

a ground system which estimates errors contained in ranging signals received from the navigation satellites, and formats and transmits correction information for correcting the estimated errors; and an airborne system which performs calculation of differential GPS positioning based on information provided from the navigation satellites and the formatted correction information, and displays a displacement from a regulated route, wherein:

the ground system has notifying means for notifying update of navigation data, when SBAS satellite navigation data used for generating the correction information is updated, by adding information regarding the update of navigation data to the correction information; and the airborne system has detecting means for detecting an update notification of the satellite navigation data that is transmitted from the ground system, and a calculating means for performing calculation of the differential GPS positioning by switching the navigation data to the updated navigation data when detecting the update of the SBAS satellite navigation data.

* * * * *